United States Patent [19]

Jamieson et al.

[11] Patent Number: 5,196,781
[45] Date of Patent: Mar. 23, 1993

[54] METHOD AND APPARATUS FOR POWER CONTROL OF SOLAR POWERED DISPLAY DEVICES

[75] Inventors: Robert S. Jamieson, Aurora, Colo.; John Weiss, Amityville, N.Y.

[73] Assignee: Weiss Instruments, Inc., West Babylon, N.Y.

[21] Appl. No.: 655,217

[22] Filed: Feb. 12, 1991

Related U.S. Application Data

[63] Continuation-in-part of Ser. No. 583,853, Sep. 14, 1990, abandoned.

[51] Int. Cl.⁵ .......................... H02J 7/00; G05F 1/67; G05F 1/56
[52] U.S. Cl. .......................... 320/61; 320/1; 323/285; 323/906
[58] Field of Search .......................... 323/906, 284, 285; 320/61, 1

[56] References Cited

U.S. PATENT DOCUMENTS

| | | | |
|---|---|---|---|
| 4,614,897 | 9/1986 | Kumbatovic | 307/640 X |
| 4,709,200 | 11/1987 | Ochiai | 320/1 |
| 4,785,226 | 11/1988 | Fujisawa et al. | 323/906 X |
| 4,918,357 | 4/1990 | Waterbury | 362/183 X |
| 4,963,811 | 10/1990 | Weber | 320/1 |
| 5,049,805 | 9/1991 | Celenza et al. | 323/285 |

*Primary Examiner*—R. J. Hickey
*Attorney, Agent, or Firm*—Frishauf, Holtz, Goodman & Woodward

[57] ABSTRACT

An automatic power control device comprising a passive, non-linear voltage detector controlling a series bipolar transistor regenerative latch circuit, acts to connect the load to a power source only when the voltage obtainable from the power source is sufficient to prevent improper ambiguous operation of the load, and further acts to disconnect the load from the power source when its voltage declines to that range which could result in ambiguous and/or erroneous operation. An electronic thermometric digital display instrument is shown, powered solely by a miniature solar panel. The instrument is amply powered, and the display is legible, even in dim light. Operation at lower levels of light is available with an economical auxiliary battery that is cut out of the circuit at when the light is as little as 5 lux.

71 Claims, 2 Drawing Sheets

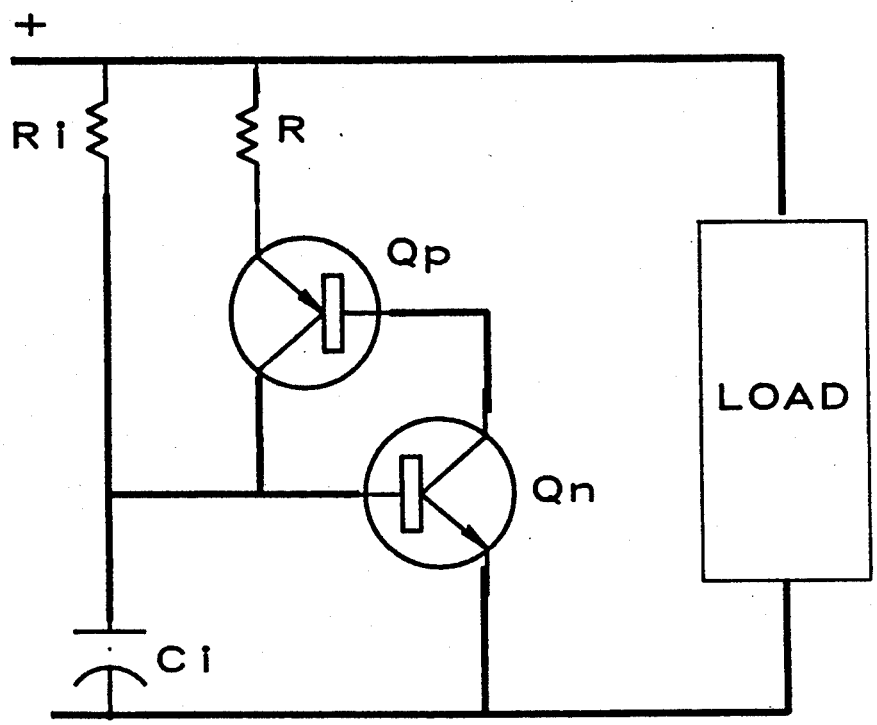
F I G. 1
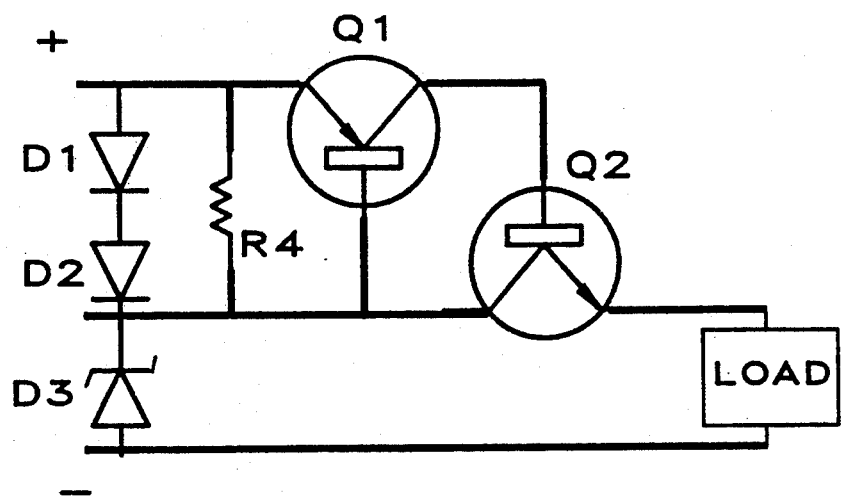
F I G. 2

METHOD AND APPARATUS FOR POWER CONTROL OF SOLAR POWERED DISPLAY DEVICES

This application is a Continuation-in-Part, of application Ser. No. 07/583,853, filed Sep. 14, 1990, now abandoned.

FIELD OF THE INVENTION

This invention relates to voltage detector/power controllers for apparatus having severely limited power sources; more particularly, to apparatus having digital displays and powered only by miniature solar panels.

BACKGROUND OF THE INVENTION

Self-powered measuring instruments using digital displays, such as pressure gages, barometers, thermometers, humidity meters and the like, commonly employ both solar panels and batteries for power sources. Various systems are employed for switching between the solar panel and battery sources; the most common being the use of isolating diodes placed in series with each power source. When the output voltage of the solar panel exceeds that of the battery, it feeds power to the digital display, its associated driver circuit, and the measuring circuitry, through its isolating diode. The isolating diode associated with the battery is reverse biased, and so does not conduct significantly. This prevents loading the battery on the solar panel. When ambient light levels decline the solar panel output declines proportionately. When its output voltage is less than the battery voltage it is automatically isolated from the display circuitry as the battery assumes the load; its isolating diode becomes biased in reverse. This "auctioneer" circuit has the virtue of being inexpensive and reliable; not being dependent on active elements such as transistors, but on passive diodes.

Alternative approaches involve the use of the voltage comparator circuits driving active switches, such as those taught by U.S. Pat. No. 4,843,224, issued to Ohta.

These solar-and-battery powered measuring instruments are typically employed as replacements for older mechanical instruments, such as dial thermometers, pressure gages, and the like—even for glass tube mercury thermometers and barometers. These older instruments were powered exclusively by the pressure or heat being measured; no other power sources were required or used. Their indicators were analog in nature. This type of self-powered indicating instrument has been in use for centuries, thus establishing a firm tradition of use. Consequently, with the advent of digital indicating devices such as the liquid-crystal-display—or LCD—and the light-emitting-diode display—commonly called the LED display—customer acceptance was dependent on replacement of the older mechanical devices without use of external power sources or wiring. Recourse was had to internal batteries, such as the compact, long-life lithium or mercury batteries. To extend battery life a small solar panel was added; long life being a prime desideratum in view of the extremely long life span of the mechanical devices being replaced.

In many cases, acceptance of the new LCD and LED instruments was also dependent on physical constraints imposed by the physical sizes and configurations of the old mechanical gages. Thus a panel-mounted instrument would, of necessity, have to mount both its display and a solar panel on the gage face. A very common standard gate face is two inches in diameter. Thus the solar panels are extremely limited in size, resulting in very low power production, especially at low ambient light levels. These instruments are exposed to widely varying levels of light; ranging from about 50,000 lux in direct sunlight to under 100 lux in boiler rooms warehouses, etc. These digital display instruments must be designed not only to withstand sunlight, but to operate at the lowest light level wherein it is possible for the display to be read easily. Hence, efficiency of power usage is a prime consideration in designs employing miniature solar panels.

Battery replacement is often more costly than the original cost of the instrument itself, because the battery is mounted internally. This requires dismounting and at least partial disassembly by a trained technician, often in remote locations. Thus, extension of battery life by solar panels is an attractive and widely adopted practice. Lithium batteries have a shelf life, without use, of about ten years; thus instrument life cannot exceed ten years. This compares poorly with mechanical pressure gages and thermometers.

Lithium cells lose their ability to furnish power at a temperature of about 20 degrees Celsius below freezing (four degrees below zero, Fahrenheit)—a common temperature encountered outdoors in winter in the temperate zone. For this reason alone, a large segment of possible uses of digital display measuring instruments remains resistant to conversion from mechanical gages. For these reasons, and for cost reasons, it would be highly desirable to eliminate the battery.

Internal batteries have an additional beneficial function that is not widely known. LCD driver circuits employ complementary metal oxide semiconductors, known as CMOS, in their logic and analog-to-digital conversion circuit. CMOS operates at low power levels; such drivers require only a few microamperes to operate a three-and-a-half digit display module. In this, and other logic switching elements, pairs of transistors inhibit each other; that is, one transistor turned on to saturation holds off a second complementary transistor, until an over-riding signal is received. At this point the second transistor is forced into its conducting state, which forces the first transistor off. However, if the transistors are not driven into saturation, ambiguity can, and does, result. Both transistors conduct simultaneously, and the circuit often oscillates. In this ambiguous state normal operation is impossible. The driven display will also oscillate, flashing on and off, or exhibit steady but erroneous information. The inventor has found this ambiguous zone to extend from about 0.35 to about 0.80 volts, in one common CMOS integrated circuit used for driving an LCD display in thermometry. Further, this ambiguous state will continue even when the input voltage is raised to normal operating levels. Until now, inclusion of a battery is necessary to prevent this from happening; once the circuit is successfully placed in operation it continues in normal operation. Periods of darkness, or insufficient light, which prevent flow of power from the solar panel, are bridged by battery power. The circuit is the never turned off—as long as the battery lasts.

Preventing ambiguous operation presents the prime difficulty in powering solely by solar power. It is not necessary for the instrument to operate in darkness, for then its display can not be read by the unaided eye. If full power is applied suddenly, such that the circuit passes quickly through the ambiguous zone, the circuit will operate in its proper mode. In solar-powered hand calculators this function is supplied by an ON switch. This approach could be used for resetting a lock-up display by disconnecting the power circuit long enough to allow load voltage to decay to zero, then closing the switch to allow proper restart. Unfortunately, the long-established tradition of mechanical instrumentation relies entirely on no operations by the instrument reader other than viewing the gage front—with the sole exception of tapping the glass of low pressure gages to remove static friction effects. Further, user acceptance is not enhanced by viewing a flashing, erratic display. Worst of all, ambiguous operation often yields a steady display of erroneous values, because of ambiguous operation of the analog-to-digital converter. In this case, it may not be apparent that an error exists. Consequently, a manual reset switch, etc., would not be used.

At the breaking of dawn, with its every gradual increase in light levels, and without a battery, extremely slow passage through the ambiguous region is guaranteed. A common cause of field rejections of instruments using solar panels and batteries is a cold, dark night, followed by the sluggish breaking of daylight. In that case, both power sources cease furnishing power during the night; with the coming of daybreak the solar panel casues the load to operate in the ambiguous zone for minutes on end. Of a significant number of LCD driver circuits tested at dawn, under solar power alone, about half will lock up in an improper mode of operation—either oscillating, or giving erroneous readings—even after full sunlight is applied. Of the remainder, if the sunlight decreases so as to bring solar panel voltage back down within the ambiguous zone, and then increases again, about three-quarters will lock up in erroneous operation.

One seemingly obvious approach to this problem would apply voltage detectors or comparators, as for one example using the teachings of Ohta, et al. Unfortunately Ohta relies on two power sources for his comparison; without a battery a second source is unavailable. Other comparators having internal reference cells are available; however, this approach brings designer full circle —back into the realm of limited battery life and temperature range.

The demands on a solar-powered device operating without a battery power source are rigorous: it must operate as intended while the solar panel is producing a voltage that could induce ambiguous operation in the detector as well. Comparator designs rely on the presence of a conventional power source of much better regulation than that furnished by a solar panel on the verge of power starvation—a power source of adequate voltage.

Accordingly therefore, it is an object of this invention to provide adequate power to a digital display device which is powered solely by solar power and which requires no manual power switch. It is another object of this invention to prevent the application of power which will result in ambiguous operation, and to apply full power—when available—suddenly. It is another object of the invention to disconnect power from the load when its voltage could cause ambiguous operation of the load, and keep it disconnected until it has declined to substantially zero. It is a further object of the invention to provide power to a measuring instrument with digital display by solar power alone, which is automatically reset into proper operation after periods of low ambient light.

SUMMARY OF THE INVENTION

The invention is characterized by a passive, non-linear detection circuit across the solar panel output. When solar panel output voltage rises above the ambiguous zone the detector conducts significant current. This current causes a forward bias at the input of a regenerative, bipolar, series transistor latch circuit, which turns on, rapidly connecting power to the load. A latch triggering capacitor provides additional turn-on power to the latch, causing rapid latching.

When solar power output declines towards the upper end of the ambiguous range, the load current passing through the series latch circuit declines to the point when the latch forward biases cannot sustain conduction, and the latch opens. The latch cannot re-latch, even if the light level increases instantaneously, for a solar panel output storage capacitor must first charge up to allow triggering bias current to cause latching. This charging time is made much longer than the time required for the load to cease operation.

BRIEF DESCRIPTION OF THE DRAWINGS

FIG. 1 is a circuit diagram of a prior art bipolar regenerative series latch "one-shot" circuit.

FIG. 2 is a circuit diagram of a generalized automatic voltage threshold detecting switch circuit of the present invention.

DESCRIPTION OF THE INVENTION

Figure 3:
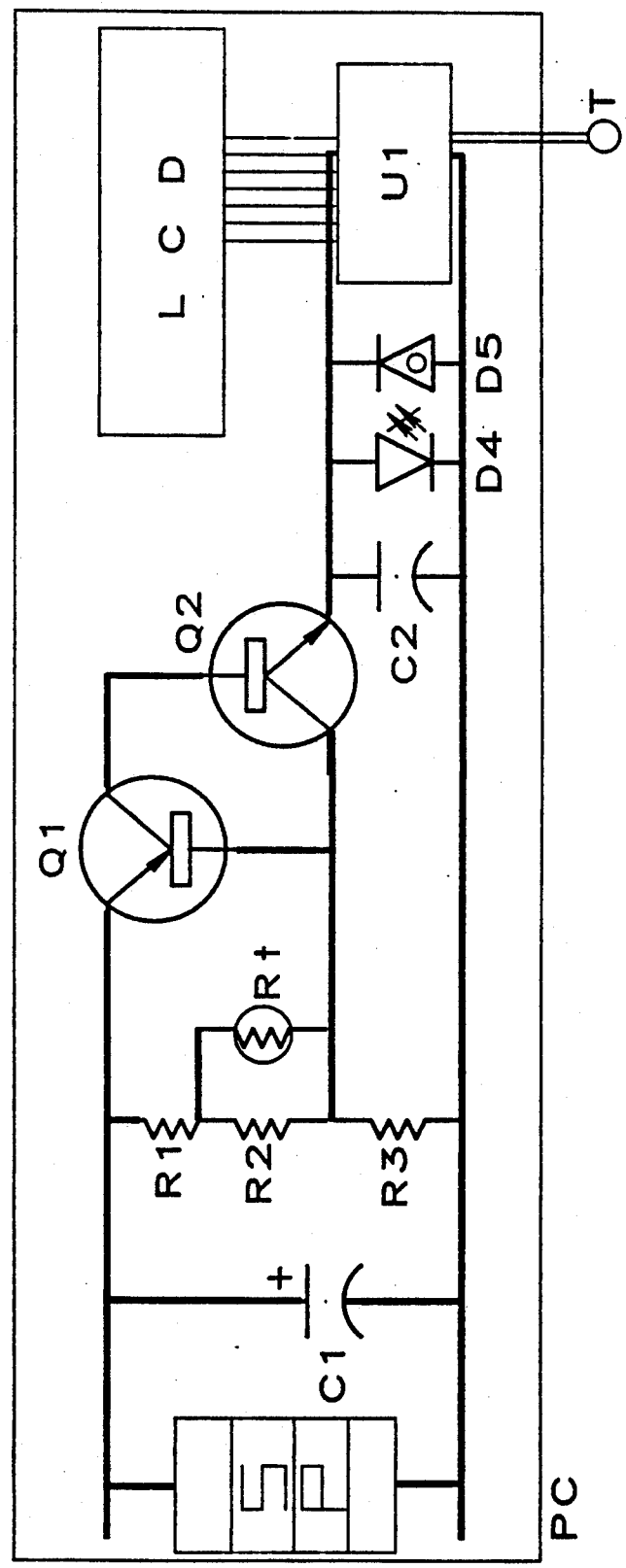
FIG. 3 is a circuit diagram of a solar powered thermometer with a liquid crystal digital display, illustrating one application of one embodiment of the present invention.

FIG. 1 is a schematic drawing of a prior art bipolar latch circuit, known in the art about thirty years before the instant invention, becoming largely obsolete with the advent of the unijunction transistor (UJT). In the latch circuit, the collectors and bases of a pair of transistor, Qp, Qn, are interconnected; the transistor having opposite polarities. Qp is a PNP transistor, Qn an NPN transistor. Control of the latch is effected by input signals at either base-collector junction. For illustration, the input signal is shown connected to the base of an in FIG. 1. The input signal is generated after a delay initiated by turn-on of the power supply; the delay generated by series-connected resistor Ri and capacitor Ci, connected between the positive and negative power conductors.

In operation, at turn-on of the power supply (not shown), transistors Qp and Qn are not conducting. The initial voltage across capacitor Ci is zero; which tends to maintain transistor Qn in its non-conducting state. Capacitor Ci is charged up by current flowing through resistor Ri; its charge rate determined by the time constant—the product of the values of resistor Ri and capacitor Ci. Charging continues until there is sufficient positive bias voltage at the base of transistor Qn to cause it to conduct current into its collector and out through its emitter. This furnishes forward bias current to the base of transistor QP, which conducts current into its emitter and out from its collector, causing current to flow through the load resistor R; thus causing a voltage to appear across resistor R. This collector current through transistor Qp furnishes additional base current drive for transistor Qn—turning the latter on harder. This process of mutual regeneration continues until both transistors are saturated, and no more current can be drawn through resistor R. The prior art circuit of FIG. 1 furnishes a delayed connection of load resistor R1 across the power supply, in a manner similar to the action of a conventional delayed "one-shot" multivibrator. As with a UJT, the circuit can be made to oscillate, with the proper combination of resistors and capacitors, connected according to principles well-known by those skilled in the art.

As long as the power supply voltage furnishes sufficient voltage the circuit will remain latched on. Even if the base current furnished by resistor Ri is interrupted the circuit will remain latched, for each transistor furnishes full base drive for the other. As the supply voltage declines the transistors will become unsaturated, but remain conductive—and latched. The load current through resistor R will decline gracefully down to a very low level, whereupon regeneration will no longer be supported and the circuit will cease conducting—becoming unlatched. The unlatching voltage is a function of transistor gains, load resistance, and power supply impedance.

FIG. 2 is an exemplary schematic of the novel improved series bipolar latch and passive voltage threshold detector circuit of the instant invention. Transistors Q1 and Q2 are a bipolar pair with bases and collectors interconnected, as with the prior art latch. The input signal to trigger latching is furnished to the base of transistor Q1, by means of a passive voltage detector comprising the series string of diodes D1, D2, and Zener diode D3. This voltage detector diode string can be thought of as a non-linear voltage divider whose individual elements are voltage limited. Of these, trigger diodes D1 and D2 furnish forward bias to transistor Q1. Bypass, or shunting, resistor R4 provides fine adjustment of the trigger current applied to the base of transistor Q1 by diverting current around its emitter-base junction in addition to the diverted by diodes D1 and D2. In some applications resistors R4 can be omitted; adjustment being made by varying the number and/or type of diodes chosen. For example, one or more trigger diodes could be germanium, thus lowering the bias and diverting more current around the base-emitter junction of transistor Q1. This would raise the supply voltage needed to trigger regeneration. Contrarily, a germanium diode placed in series with diodes D1 and D2, would reduce the current diverted around the base-emitter junction of transistor Q1. This would reduce the supply voltage at which latching occurs.

If the voltage detector diodes, D1, D2, and D3, were ideal diodes, they would not conduct any current until the power supply voltage exceeded the sum of the individual diode voltage drops. That is, if diode D3 were a 3.3 volt reverse-breakdown, or Zener, diode, no current would flow until the power supply reached 4.5 volts—allowing for the usual maximum forward conduction voltage drop of 0.6 volts for silicon diodes. At a supply voltage of 4.5 volts there would be a possible forward bias on the base of transistor Q1 of −1.2 volts, with respect to its emitter. This would cause transistor Q1 to conduct strongly, and drive transistor Q2 into saturation; which would saturate transistor Q1, in turn.

Since ideal diodes are not available, actual diodes will conduct minute amounts of current before their forward, or saturated, voltages are reached. Hence, actual voltage to cause latching will depend upon the voltage-current characteristics of the diodes used, and transistor gains. As the voltage applied to a diode is increased, the current rises along a steep slope, which slope declines in steepness as saturation voltage is approached. This slope becomes almost zero at full conduction. Thus, at low voltages and minute currents actual diodes act as non-linear resistors. This non-linearity, while not as great as the discontinuous non-linearity of ideal diodes, nevertheless acts similarly to prevent triggering of the latch until the desired voltage is reached. Further, the steep slope of the voltage-current characteristics of the trigger diodes has the beneficial effect of increasing latching speed.

The triggering diodes and adjusting resistor R4 have an additional important function: unlatching voltage is increased substantially over that of the prior art latch, whereby operation within the ambiguous zone is prevented. Since diodes D1 and D2 (and resistor R4, when used) divert some load current around the base-emitter junction of transistor Q1 its base starves sooner than in the prior art configuration. This substantially raises the voltage at which the circuit unlatches.

Diode D3 need not be a reverse-breakdown diode. It can be a string of one or more series-connected forward-conducting diodes selected in number and characteristics to give the desired voltage at which latching will occur. For one example, light-emitting-diodes, or LEDs, have higher forward voltage drops than do ordinary silicon and germanium diodes, ranging from 1.2 to 1.8 volts. These are also manufactured for use as voltage references, being packaged in an opaque case, which is cheaper to manufacture than cases which incorporate a transparent window. Since Zener diodes are not available for voltages under 1.9 volts, these "non-lighting," or "dark" LEDs, used in combination with ordinary silicon and germanium diodes, will provide any desired lower voltage at which latching is to occur.

A passive non-linear voltage threshold detector composed only of diodes in series provides the capability of limiting the supply voltage, an additional benefit in systems whose power source voltage can vary widely—as in solar powered systems which must operate under dim light, yet which can be exposed to direct sunlight.

While a passive voltage detector could be built from a string of resistors in series, latching action would not be quite as rapid. Variations in transistor gain would cause a wider range of latching voltages. In certain applications linear resistors may be used in conjunction with one or more diodes; the latter providing sufficient non-linearity to be beneficial in latching. The resistors may be used in temperature compensation by choice of the proper temperature coefficient of resistivity. In conjunction with stiffer power sources, a non-linear voltage threshold detector employing at least one series resistor would be beneficial in limiting the high current which would otherwise occur if the detector comprised diodes only.

As discussed heretofore, it is desirable to prevent application of power to LCD displays and driver circuits when the voltage would be such as to cause ambiguous operation; that is, from about 0.35 to 0.80 volts. In addition, operation at such low voltages will not cause the display itself to be legible; LCD displays normally require operating voltages of about 0.90 volts minimum, depending on the particular model of display. Thus, the latching voltage should be set high enough to cause the display to be legible; which will also prevent the driver and measuring logic circuits from becoming locked up in an ambiguous mode of operation—if the latching occurs quickly.

Further, it is desirable to unlatch the latch circuit when the supply voltage decays into the voltage range which could cause ambiguity, and to further prevent re-latching until the supply voltage is at least large enough to provide display legibility and prevent ambiguity. The system should have enough hysteresis to prevent oscillatory undesired latching and unlatching at the same voltage levels; that is, unlatching should occur at a supply voltage lower than latching.

The above objects are accomplished in the circuit of FIG. 2, as follows: Latching occurs when the current through the diode D—less that diverted through diodes D2 and D2 and resistor R4—causes conduction of transistor Q1 such that regeneration occurs. Unlatching occurs when that portion of load current—and current through diode D3—not bypassed by the trigger diodes and adjusting resistor—declines to a level too low to support regeneration. Since load current is usually much greater than that through diode D3, unlatch control is primarily a function of diodes D1 and D2, resistor R4 (and transistor gains). The current through D3 before latching occurs has been measured to be 1.2 microamperes, after latching at low light levels only 0.1 microamperes current is diverted through d3, an insignificant drain on the load current of 4 to 6 microamperes. That is, increasing the percentage of load current bypassed increases the unlatching voltage. Latch control is primarily affected by the percentage of current passed by diode D3 not bypassed by diodes D1 and D2, and resistor R4—at the desired supply voltage at which latching is to occur. Or, stated alternatively, increasing the detector current (while holding the bypass percentage constant) reduces the latching voltage.

PREFERED EMBODIMENT

FIG. 3 is a schematic diagram of the principles of the instant invention applied to a particular solar powered digital display thermometer used in measuring temperatures from −58 F. to 158 F. Transducer T is a thermistor with a nominal value at room temperature of about 2200 ohms, and a large negative coefficient of resistance with temperature. It is placed within a protective metal probe at the end of a shielded two conductor cable of a length required by the distance between the point of measurement of temperature and location of the display. Except for the probe and cable, the entire instrument is placed within a cylindrical case of 2.5 inch diameter—a common gage case size. The face of the gage contains two active elements: liquid crystal display LCD and solar panel SP. Within the case is mounted a printed circuit card PC containing the electronic devices, interconnecting to form the circuit of the present invention.

Display LCD presents digits of about 0.75 inch height; there are three full digits a degree symbol with associated selectable Fahrenheit or Celsius symbols, and a so-called half digit which is used solely to display a most significant digit of "1" for those temperatures above 99.9 degrees. The least significant digit displays tenths of degrees, and has an associated decimal point symbol. This type of display is commonly termed a three-and-a-half place display.

Integrated circuit U1 contains all circuits used for measuring the desired parameter and driving display LCD. Briefly, integrated circuit U1 contains a sample-and-hold circuit which periodically converts the resistance of transducer T into analog signals proportional to the temperature being measured; these latter are sent to an analog-to-digital converter circuit which produces signals representing decimal numbers for display. These latter signals activate the display drivers, which send polarizing signals to the display segments over a plurality of conductors represented symbolically in the figure. The drivers may be multiplexed driver circuits, or direct drivers, as desired. For brevity, further details of internal operation of integrated circuit U1 are omitted herein, being well-understood in the art. U1 is a variant of a CMOS integrated circuit commonly used for digital fever thermometers, programmed for an expanded range of −58 to +158 degrees Fahrenheit or −50 to +70 degrees Celsius and draws an average current of about four microamperes at a supply voltage of 1.1 volts, the threshold of legibility of display LCD, increasing to an average of about 6.5 microamperes at a supply voltage of 1.5 volts. The current drawn during transducer sampling is substantially higher than this average value; an event which occurs every ten seconds. At time of assembly a sampling interval of one second may be chosen by soldering across two interdigitated pads on the printed circuit card—in the same manner that choice is made between Celsius or Fahrenheit measurement and display. Ordinarily the ten-second interval is chose, for the one-second sampling increase the power requirements substantially and often causes such frequent changes in the numbers displayed—especially in the least significant digit—as to be considered annoying by some users. The increased power required by frequent sampling increases the minimum ambient light level in which the device can be used when solar power is employed.

Solar panel SP is a common type used in digital gages, calculators, small toys, and other devices: Kaneka model KSC-15S. It is about 38 mm long by 13 mm wide, and comprises four cells in series. Hence, its no-load output voltage is limited to about 2.5 volts at light levels of about 50 to 150 lux. At high light levels, as in direct sunlight, it can reach a no-load voltage of about 3.0 volts. At an ambient light of 150 lux this panel is rated to produce 9 microamperes at 1.5 volts. Obviously, at desired light levels of about 100 lux, it is evident that solar panel SP is operating close to power saturation when loaded solely by its intended load of integrated circuit U1, display LCD, and transducer T—there is little power available for power detection and control circuitry. Yet, at low light levels such supervisory circuitry is needed most, to prevent ambiguous and erroneous operation.

Referring again to FIG. 3, energy storage capacitor C1 is connected across the terminals of solar panel SP. It is an electrolytic capacitor capable of a large capacitance in a small volume. In the thermometer of FIG. 3 it is a 470 microfarad capacitor rate at 5.0 volts. Capacitor C2 is connected across that output load in order to suppress the transient voltage drop that occurs during the update cycle, every 10 seconds. C2 is a ceramic disc type with a capacitance of 0.047 μF, this is small enoughto disipate power within 0.25 seconds after unlatch thus making a premature latch from above 0 volts unlikely.

Resistor R1, R2 and Rt comprise the latch reference. Typical values are 33K ohm for R1, 470K ohm for R2 and 200K ohm at 25 C for Rt. Rt is a negetive coefficient thermistor and thus acts to increase the latch reference resistance/voltage as the ambient temperature decreases thus compensating for the expected lower gain of the transistor latch at lower temperatures. R3 is the circuit reference voltage resistor and thus takes the place of D3 in FIG. 2. In the case of the thermometer resistors are used in place of the diodes because they exhibit less sensitivity to ambient temperature changes and means for compensation are easily achieved with the use of thermistors as previously explained. Transistor Q1 is a MPS3640, transistor Q2 is a 2N4124. They are low power switching types however general purpose transistors can be used. Diode D4 is a "dark" LED with a forward-conduction voltage drop of 1.5 volts. This diode clamps the output voltage of the latch to a maximum of 1.5 volts, whenever solar panel SP is exposed to strong light. Diode D5 is reverse biased, and only conducts leakage current before latching occurs. At that point its reverse leakage limits voltage on the load to a few millivolts prior to latching. More importantly, it provides a load for the latch as it first starts to conduct, before there is sufficient voltage to turn the load on. Without it, the open-circuit impedance of non-conducting integrated circuit U1 allows as much as 0.40 volts to appear. Of course, once integrated circuit U1 conducts, latching is immediate, as load current is allowed to flow. However, to prevent any possible ambiguities which might result—even though none have been observed—diode D5 to employed. Excellent results are obtained from use of a germanium diode, a 1N34ATR, in this application; although essentially similar results are obtained from a silicon diode shunted by a 4.7 megohm resistor. Diode D5 is essentially a non-linear resistor, and could be replaced by one having similarly voltage-current characteristics.

The direct connection between the integrated circuit U1 of FIG. 3 and the solar panel can conveniently be grounded, while the transistor latch operates on the ungrounded side of the circuit. In the case of FIG. 3 that side of the circuit is the side connected to the positive terminal of the solar panel. Of course it is also possible for the positive side of the solar panel to be grounded, in which case it will be necessary to reverse the polarity of the electrolytic capacitor C1 and likewise that of the diodes D4 and D5 and the polarity types of the transistors Q1 and Q2.

OPERATION OF THE EMBODIMENT OF FIG. 3

Beginning at dawn, after a period of darkness, the output of solar panel SP is zero, and no current passes through any circuit element. As the light increases so does the output voltage of solar panel SP. Conduction of current through the resistor string passive voltage detector resistors R1, R2, Rt and R3 is so slight that solar panel SP is operating essentially under no-load conditions, except for charging current drawn by storage capacitor C1. Therefore, with the very slow increase in light levels associated with dawn, capacitor C1 charges gradually towards open-circuit voltage in the vicinity of 2.5 volts.

In contradistinction, even if solar panel SP is suddenly irradiated with a strong light, the voltage rise of capacitor C1 is limited by the effective internal source resistance of solar panel SP. This is in the vicinity of the tens of thousands of ohms; hence the charging time constant is almost eight seconds long. Latching voltage is not reaches for about 20 seconds.

The nominal full conduction voltage of the passive voltage detector resistors R1, R2 Rt and R3 is 2.45 volts—a value attainable with strong light exposure. However, at a voltage of about 2.10 volts a 1.3 microampere current flows; this is sufficient to generate a voltage drop of about 0.56 volts across the latch reference resistor string, R1, R2 and Rt. This provides the base of transistor Q1 with a bias of −0.56 volts, and it turns on. This provides base current for transistor Q2, as already described, and latching gets underway. Conduction of the latch into integrated circuit U1 causes a starting current pulse larger than full operating current to flow; at least light levels solar panel SP cannot furnish this current and it must come from capacitor C1. As stated previously for transient currents, capacitor C2 charges quickly upon latching and thus will supply transient current for the first update cycle. The voltage across the latch changes from almost full supply voltage to about 0.62 volts at full conduction; comprising about 40 millivolts collector-emitter voltage and 0.56 volts across the biasing diodes. Thereby, even at every low levels, voltage is not applied to integrated circuit U1 until it is well above levels which could cause erroneous or ambiguous operation, and is applied substantially instantaneously. In the circuit of FIG. 3, the initial voltage applied to integrated circuit U1 is about 1.83 volts, at least levels under 80 lux.

As such low light levels solar panels SP cannot furnish the full operating load current, and the supply voltage stored in capacitor C1 decays. At about 75 lux, from fluorescent lamps, and about 55 lux from incandescent lamp sources, at an ambient temperature of about 25 degrees Celsius, this decline finally multiplexing 1.15 volts applied to U1. The sensing and display multiplexing cycles operate continuously and accurately; at this level the display is quite legible—especially when viewed from the optimum off-axis viewing angle. This light value is very low, compared to well-lit offices having about 500 lux. In fact, any significant reduction of these low light levels will impair ability of many humans to read the digits displayed.

A very low light levels—as low as 35 lux—the latch will connect the integrated circuit long enough to allow one clear display cycle before it fades into invisibility and the latch unlatches.

The automatic power supply switch circuit of FIG. 3 unlatches at about 1.1 volts on the load (which is about 1.7 volts supply). Thus, with the slow charging of capacitor C1, frequent flashing of strong lights on solar panel SP, superimposed on very low background levels of ambient light, cannot cause immediate re-latching. In fact, occasionally a serendipitously well-timed flash will appear to hasten un-latching.

It should be noted that if the latch is designed to work with substantially higher load currents, biasing can be accomplished with one diode at the base of transistor Q1.

For latching at even smaller currents, and/or for a faster latch, higher gain transistors may be employed, in place of those types used in the exemplary circuit of FIG. 3. Alternatively, one or both latch transistors may be a Darlington combination and resistor R3 can be replaced with the nonlinear diode D3 of FIG. 2. In these cases, care must be taken to prevent latching from leakage currents alone, at higher temperatures.

When the automatic supply voltage controller of the instant invention is applied to LED display devices, the same principles of design obtain. LEDs require a higher operating voltage and substantially more power: 120 milliamperes current at 5 volts—or 600 milliwatts. Obviously the solar panel of the example of FIG. 3 cannot be used, nor can any solar power generator available today be mounted on the gage front. However, there are many applications where a separately-mounted, larger solar panel can be deployed in the vicinity of the display, keeping wiring to a minimum. LEDs are at their best in darkness and very dim light, such as in boiler rooms, deep in the engine rooms of ships, etc. Often a solar panel mounted a few feet away, on the other side of walls, bulkheads, etc., can furnish all the power needed. A panel of about 25 square inches, exposed to sunlight, should develop the needed power.

Even if a storage battery is employed the instant invention will be beneficial, for it will minimize battery drain. As heretofore discussed the invention will furnish power of the proper magnitude for short intervals even when the light is far below the threshold sufficient to maintain continuous operation. This power can be used for display and/or battery charging, by use of isolating diodes in each supply line, in the "auctioneer" arrangement of wide use in the art.

Figure 4:
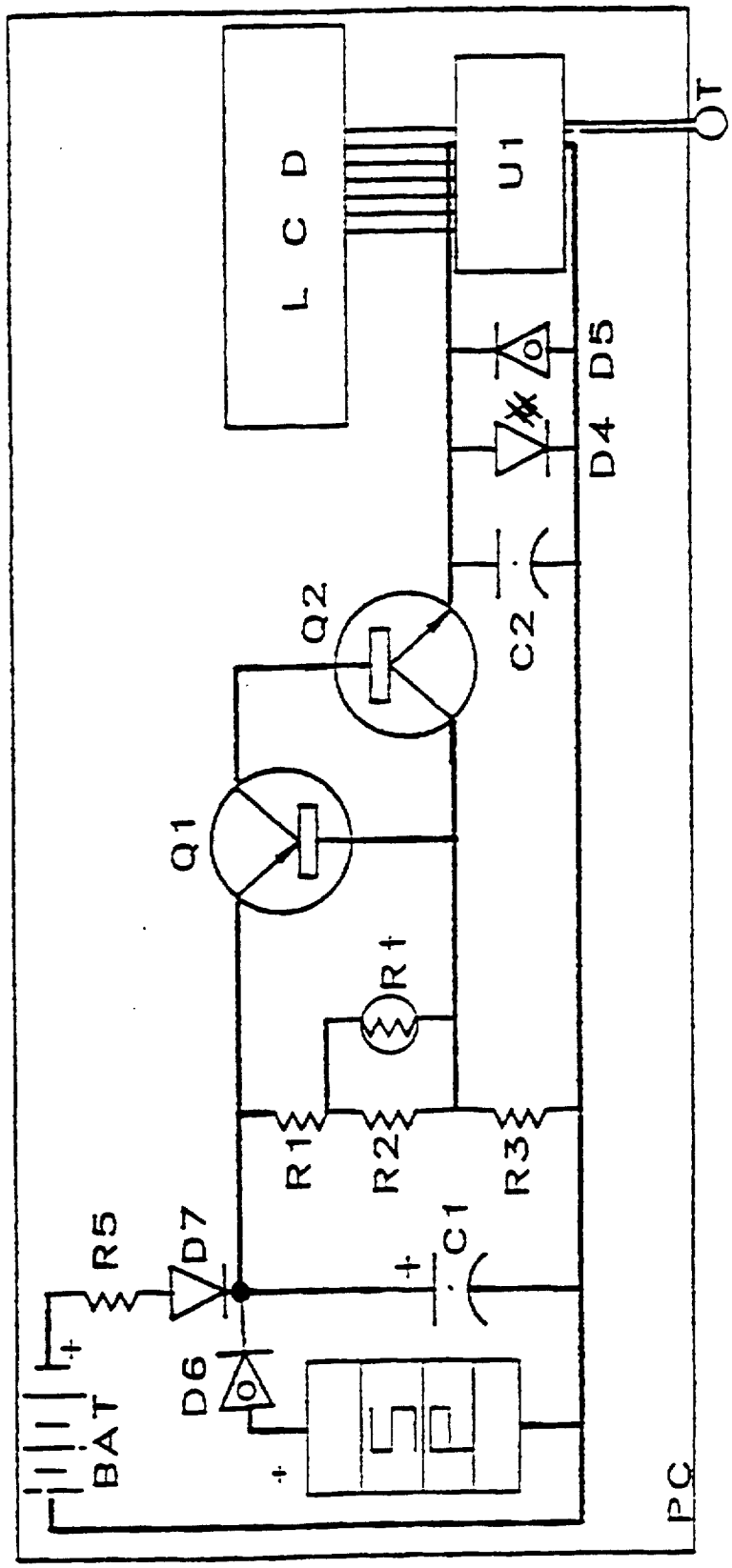
FIG. 4 is a circuit diagram of a battery-assisted solar powered thermometer with a liquid crystal display.

When a battery is used in combination with a voltage detection circuit and a passive "auctioneering" diode pair, the power available from the battery can be employed to reduce the required light to activate the latch. In FIG. 4 a 3-volt lithium battery BAT is stepped down by a resistor R5 and a silicon diode D7 and connected to the power input side of a circuit like that of FIG. 3 except for the "auctioneering" diode D6 now necessary between the solar panel SP and the positive side of the circuit.

With R5 equal to 270 k ohms the light required to latch is only 5 lux, barely visible to the human eye. With other values latching can generally be provided at some light value between 2 and 8 lux. Below this latching level the current supplied by the solar panel plus the current furnished by the battery is not sufficient for continuous operation and the circuit unlatches, thus saving the battery depletion associated with powering the IC while in the dark. As the light level elevates, the solar panel accepts a greater share of the power to drive the circuit. This battery "assist" circuit will conserve battery power for very low light, when the display is hardly readable, and also in moderate and bright light when the solar panel is the main power source. Only in light levels between about 5 and 35 lux is the battery providing the main power. After the inevitable life term of the battery is reached, the device reverts to solar-only operation.

In addition to the reliability provided by the prevention of erroneous readings resulting from operating in the ambiguous zone, accuracy is improved by controlling the operating voltage within a narrow band. The analog signal returned to the IC during the update cycle is a voltage response to the resistance of the transducer T. This signal is affected by the input voltage to the IC. Experiments have shown that a zero shift of +3° F. occurs for an operating voltage variation between 0.85 and 1.3 volts. By combining the latch voltage control and the use of the nonlinear device D4 to control the upper limit, an operating voltage band of 1.15 to 1.3 volts is obtained. This narrow band results in less than 1° F. of zero shift. Readability is also enhanced by limiting the LDC display voltage to prevent a faint display with low voltage and to avert "ghosting"; visible nonactive segments when the display is overdriven by high voltage.

Figure 5:
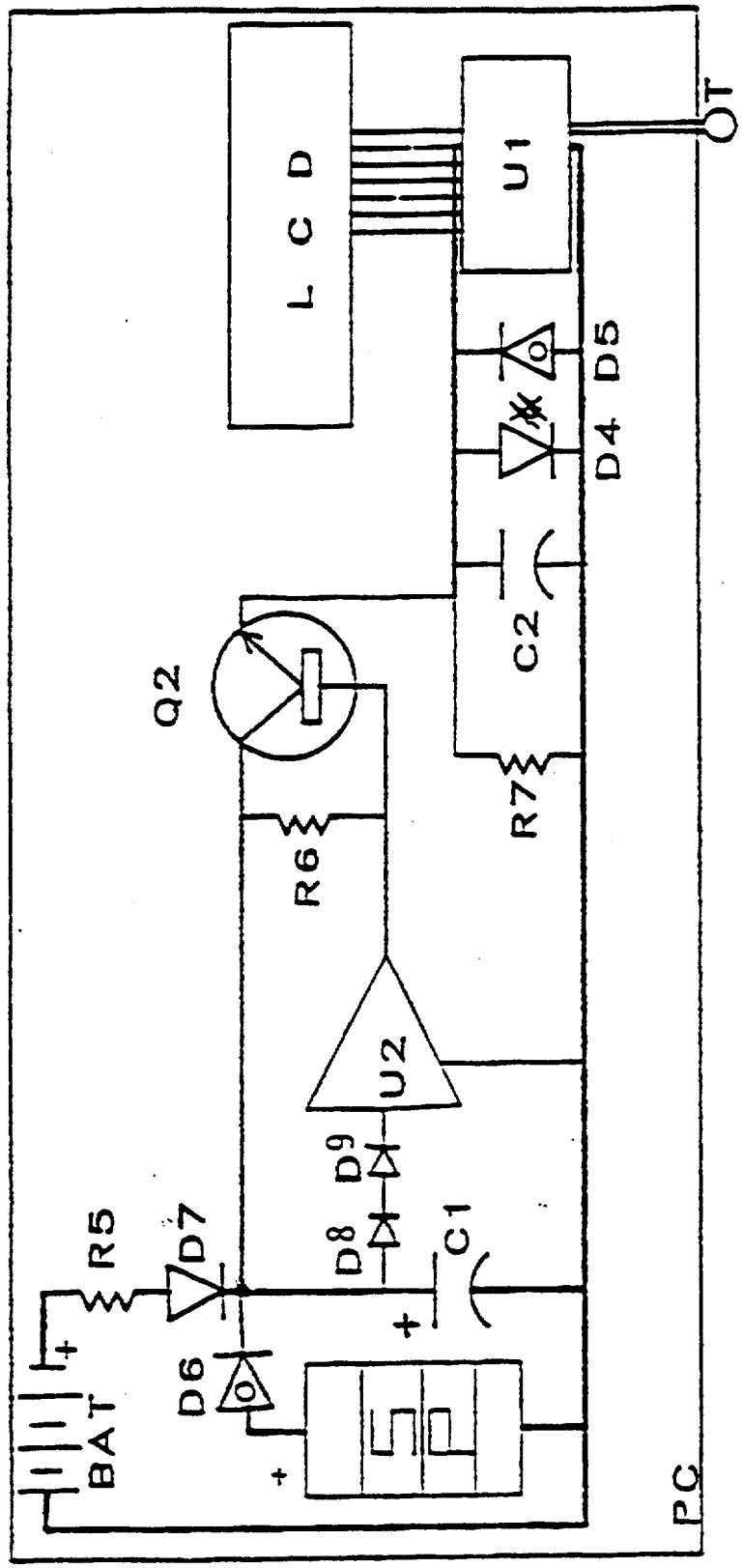
FIG. 5 is a circuit diagram of a battery-assisted solar power thermometer using a voltage detector with components serving to control the operating voltage band.

FIG. 5 shows a voltage detector used in the voltage control circuit in conjunction with the battery-assist and narrow operating voltage band circuit. The voltage detector U2, a Seiko S-805 type, is used to switch on transistor Q3 in a manner similar to that of the voltage comparator circuit driving an active switch in the Ohta patent cited above. With no light the battery powers the voltage detector only, drawing between 1. 4 and 3 microamperes. The voltage drop across R5 and D7 is 1.4 volts, with a 3-volt battery, and the detection voltage is then 1.6 volts. Through the "auctioneering" diode D6 only a small portion of power is required from the solar panel to reach a detection voltage of 1.7 volts. At this point the voltage detector goes low, the resistor R6 provides a current path to bias transistor Q2 and power is supplied to the load U1.

Voltage control is achieved by stepping the voltage down through the diode string D8 and D9 to the voltage detector U1. This voltage control diode string as shown has two silicon diodes having a 0.3 volt drop each to a 1.1 volt voltage detector U2. The light level to latch can be lowered by replacing one silicon diode, for example D8, with a germanium diode exhibiting a 0.1 volt drop and thus only a 1.5 volt source voltage to latch. This, however, will increase the operating voltage band and cause a greater ambient light effect.

Using a solar panel of the type previously described measuring 56 mm by 14 mm, the light level required to trigger the voltage detector is 5 lux. At this low light level the battery is supplying the greater share of power. The battery's current drain is 4.5 microamperes while the solar panel provides less than 1 microampere. The switch over point at which the solar panel supplies enough current to take over is 35 lux in the illustrated case. More generally that crossover point at which the battery can be disposed with may be expected to occur at between 30 and 40 lux. As in the previous example the expected depletion of the battery will result in solar-only operates with the latch occurring at 35 lux.

Unlike the example illustrated in FIG. 4 that uses discrete components for transistors, diodes and resistors, the voltage detector device used in the circuit of FIG. 5 is in itself a CMOS integrated circuit and exhibits an ambiguous voltage region between 0 and 0.5 volts. Upon initial start-up the voltage detector will not hold transistor Q2 off and Q2 will leak unwanted current to the load. When the supply voltage first reaches 0.5 volts a 0.4 volt load voltage exists. Although 0.4 volts is not enough to drive the LCD and display to an erroneous reading, it is in the ambiguous region as previously discussed and start-up from this point would cause improper operation. As the supply voltage increases above 0.5 volts the transistor Q2 is held off and current is no longer supplied to the load. At this point in time the load voltage will begin to decline. Without the sample, hold and display functions operating, the equivalent resistance of the load U1 is very high, causing a slow dissipation of the undesired load voltage. It has been observed that high fluorescent lighting will extend the inactive zone of the voltage detector to 0.7 volts, allowing the load to reach 0.55 volts before the voltage detector operates. A 2 megohm resistor R7 is used to provide a current path to diminish rapidly the power stored in the load capacitor C2 to below the ambiguous zone before the source voltage reaches the 1.7 volts trigger point. This method avoids the ambiguous regions of both the voltage detector and the load IC.

As before the ambient light effect on accuracy is minimized by controlling the operating voltage band, using a non-linear diode D4 to limit the upper voltage to 1.3 volts and setting the voltage detector to control a lower operating voltage to above 1.15 volts.

The circuits of FIGS. 2, 3, 4 and 5 illustrate the principles of the invention and it will accordingly be recognized that in the application of the principles of the invention variations and modifications are possible in many respects.

By application of the principles of the invention described herein, other applications will become apparent to those skilled in the art. No limitations are intended or implied herein, other than those of the appended claims.

We claim:

1. A lower power latch circuit for connecting and disconnecting a source of d.c. electric power to and from a load, said source and said load each having first and second means for connections of opposite electric polarity, said source having an output voltage subject to variation, said latch circuit comprising:

first and second bipolar transistors (Q1, Q2) of opposite polarity types, each having emitter, base and collector connections and each having its base connected to the collector of the other, whereby between the respective emitters of said transistors a regenerative latch unit is constituted;

a substantially resistive voltage divider (D1, D2, D3; R1, R2, R3, Rt) connected between said first and second connection means of said d.c. power source and having a tap connection, which is connected to the base of said first transistor, the emitter of said first transistor being connected to said first connection means of said d.c. power source, the emitter of said second transistor being connected to said first connection means of said load, and the second connection means of said load being connected to the second connection means of said d.c. power source, with the particular electric polarities of said first and second source and load connections and the particular conductivity types of said first and second transistors being suited to each other for operation of said latch unit as a series latch circuit, whereby the voltage divider provides by said tap connection a control of said latch which avoids unstable operation of said latch during relatively low voltage output of said d.c. source.

2. The latch circuit of claim 1, wherein a capacitor (C1) is connected between said first and second connection means of said d.c. power source for providing additional turn-on power to said latch unit and thereby producing rapid latching.

3. The latch circuit of claim 2, wherein said capacitor is an electrolytic capacitor.

4. The latch circuit of claim 1, wherein said resistive voltage divider contains at least one diode for taking advantage of the non-linear conduction characteristic of a diode.

5. The latch circuit of claim 4, wherein the portion of said divider connected between the emitter and base of said first transistor comprises at least one diode (D1, D2) connected for forwardly biased operation.

6. The latch of claim 4, wherein the portion of said divider connected between said tap connection and said second connection means of said d.c. source and of said load comprises a reversely biassed diode (D3).

7. The latch circuit of claim 1, wherein there is connected between said first and second connection means of said load a current leakage path allowing enough leakage therethrough to prevent a current leaking through said latch unit in its unlatched state from causing voltage across said load to increase.

8. The latch circuit of claim 7, wherein said low level leakage diode is a reverse biassed germanium diode.

9. The latch circuit of claim 2, wherein a second capacitor (C2) is connected between the emitter of said second transistor and said second connection means of said d.c. source and of said load, whereby premature unlatching consequence of a transient load condition is preventable.

10. The latch circuit of claim 2, wherein voltage limiting means are connected between said first and second connection means of said load so that said latch circuit may be used with a d.c. voltage source of variable voltage output and a load which is optimally driven at a voltage which, when present, remains within a limited voltage band.

11. The latch circuit of claim 10, wherein said voltage limiting means is a light-emitting diode.

12. The latch circuit of claim 11, wherein said d.c. power source is a solar power panel and said load includes a driver circuit (U1) for a visual display.

13. The latch circuit of claim 12, wherein said load also includes means for measuring a physical condition connected to said driver circuit for display of a physical condition measurement in said visual display.

14. The latch circuit of claim 12, wherein said display driver circuit is part of an integrated circuit which also includes a sample and hold circuit for making intermittent measurements of said physical condition, and wherein a second capacitor (C2) is connected across said load to prevent said intermittent measurements from producing premature unlatching of said latch circuit.

15. A d.c. power supply powered at least in part by a solar panel and capable of powering, unattended in varying light conditions, a load which includes a driver unit (U1) which is optimally driven by a voltage which, when present, remains within a limited voltage band, comprising:

a solar panel having positive and negative output connections;

a first capacitor (C1) having a first terminal connected to a first terminal of said solar panel and also directly connected to a first connection means of a load, said capacitor having a second terminal connected to a second output terminal of said solar panel;

a first transistor (Q2) having a substantially switchable conduction path connected between said second terminal of said first capacitor and a second means of connection of said load and having a control electrode;

voltage detection means (U2, Q1, R, R2, R3, Rt, D1, D2, D3, R4) for detecting a voltage lying above a first lower predetermined voltage value and for producing, at an output connected to said control electrode of said first transistor (Q2), an output signal for turning on said transistor after said voltage exceeds a second higher predetermined voltage value, which voltage to be detected is a voltage that rises and falls with a voltage contemporaneously present between said first and second terminals of said capacitor;

voltage limiting means (D4) for defining an upper limit of said limited voltage band, and means interconnecting said transistor (Q2) and said voltage detector (U2, Q1) for accelerating turn-on of said transistor and for keeping said transistor turned on, after being turned on, during continued presence of said output signal of said voltage detector.

16. The d.c. power supply of claim 15, wherein said voltage detection means comprises a second transistor (Q1) of a polarity type opposite to that of said first transistor (Q2) and a resistive voltage divider (D1, D2, D3, R4; R1, R2, R3, Rt) having a tap connection connected to a control electrode of said second transistor and being connected between said first and second terminals of said first capacitor, said means for keeping said first transistor turned on being the connection of said switchable conduction path of said first transistor (Q2) between said tap of said voltage divider and said second connection of said load while said second transistor (Q1) has a switchable conduction path interposed between said control electrode of said first transistor and said second terminal of said first capacitor (C1).

17. The power supply of claim 16, wherein said first polarity connection for said load is connected to the negative output connection of said solar panel, said second polarity connection for said load is connected to the emitter of said first transistor (Q2), the positive output connection of said solar panel is connected to the emitter of said second transistor (Q1) is of the NPN polarity type and said second transistor is of the PNP polarity type.

18. The power supply of claim 16, wherein said first capacitor is an electrolytic capacitor.

19. The power supply of claim 16, wherein said voltage divider contains at least one diode for taking advantage of the non-linear conduction characteristic of a diode.

20. The power supply of claim 16, wherein the portion of said divider connected between the emitter and base of said second transistor (Q1) comprises at least one diode (D1, D2) connected for forwardly biassed operation.

21. The power supply of claim 16, wherein the portion of said divider between said tap connection and said first one of said output connections of said solar panel comprises a reversely biassed diode (D3).

22. The power supply of claim 16, wherein a diode (D5), for allowing current leakage of a very low level to prevent current leaking through said said transistors in their non-conducting states from causing the voltage across said load to increase, is connected between said first polarity load connection and said load connection for a polarity opposite to said first polarity.

23. The power supply of claim 22, wherein said low level leakage diode is a reverse biassed germanium diode.

24. The power supply of claim 16, wherein a capacitor (C2) is connected between the emitter of said first transistor (Q2) and said load connection of said first polarity for preventing premature unlatching of the power supply from the load in consequence of a transient load condition.

25. The power supply of claim 16, wherein voltage limiting means (D4) are connected between the emitter connection of said first transistor (Q2) and said load connection of first polarity.

26. The power supply of claim 25, wherein said voltage limiting means is a light-emitting diode.

27. The power supply of claim 16, wherein said load includes a driver circuit for a visual display and means for measuring a physical condition connected to said driver circuit for display of a physical condition measurement.

28. The power supply of claim 27, wherein said display driver circuit is part of an integrated circuit which also includes a sample and hold circuit for making intermittent measurements of said physical condition, and wherein a second capacitor (C2) is connected across said load to prevent said intermittent measurements from producing premature unlatching of said latch circuit.

29. A method of powering by solar energy an electronic instrument having a visual display without the provision of an auxiliary battery, comprising:

charging a first capacitor, which is permanently connected to a solar panel, by electric current produced by said solar panel;

operating a regenerative bipolar transistor latch unit connected in series with power input connections of said instrument and in series with said solar panel, under control of a substantially resistive voltage divider connected in parallel with said first capacitor and having a tap connection to which a control connection of said latch unit is connected, said latch unit comprising first and second bipolar transistors of opposite polarity types, each having a base electrode connected to a collector electrode of the other, said second transistor having an emitter electrode connected to a first polarity power input connection of said instrument and said first transistor having an emitter electrode connected to a corresponding output connection of said solar panel and having a base electrode connected, for operation as a control electrode of said latch unit, to said tap connection of said voltage divider, and limiting the voltage of power supplied to said input connections of said instrument by means of a voltage limiter diode.

30. The method of claim 29, wherein said voltage limiter diode is a light-emitting diode.

31. The method of claim 29, in which advantage is taken of the non-linear conduction characteristics of diodes for controlling said latch unit by providing at least one diode in said voltage divider.

32. The method of claim 29, wherein a second capacitor connected in parallel to said power inputs of said instrument is charged through said latch unit, whereby transient changes in the amount of current delivered to said power input connections of said instrument are prevented from prematurely unlatching said latch unit.

33. The method of claim 29, wherein a slight but inevitable leakage current through said latch unit in its unlatched condition is prevented from building excessive potential across said power input connections of said instrument by means of a current leakage path connected across said power input connections.

34. A method of charging a storage battery over a wide range of light conditions by means of a solar panel assembly, comprising:

charging a first capacitor which is permanently connected to a solar panel assembly by electric current produced by said solar panel assembly, and operating a regenerative bipolar transistor latch unit connected in series with said storage battery and with said solar panel, under control of a substantially resistive voltage divider connected in parallel with said first capacitor and having a tap connection to which a control connection of said latch unit is connected, said latch unit comprising first and second bipolar transistors of opposite polarity types, each having a base electrode connected to a collector electrode of the other, said second transistor having an emitter electrode connected to a first polarity power input connection of said instrument and said first transistor having an emitter electrode connected to a corresponding output connection of said solar panel and having a base electrode connected, for operation as a control electrode of said latch unit, to said tap connection of said voltage divider.

35. The power supply of claim 16, powered exclusively by said solar panel.

36. The power supply of claim 16, powered exclusively by said solar panel.

37. The power supply of claim 16, further comprising:

an auxiliary battery for assistance at low light levels, said battery having a first terminal connected to said first output connection of said solar panel, said first a battery terminal being of the same polarity as said first solar panel output connection, said battery having a second terminal connected through a first auctioneer diode (D7) to a circuit point to which said emitter of said second transistor (Q1) is connected, a second auctioneer diode (D6) being interposed in circuit between the second output connection of said solar battery and said circuit point to which said emitter of said second transistor is connected, the voltage of said battery and the resistance value of at least said second auctioneer diode being so chosen that in darkness greater than a first threshold light level said latch unit is unlatched, in a band of light levels just above said first threshold light level both said solar panel and said auxiliary battery supply power to said load and at light levels above a second threshold light level only said solar panel supplies power to said load.

38. The power supply of claim 37, wherein a current limiting means (R5) is interposed in series with said first auctioneer diode (D7) between said auxiliary battery and said circuit point to which said emitter of said second transistor (Q2) is connected.

39. The power supply of claim 37, wherein said first polarity connection for said load is connected to the negative output connection of said solar panel, said second polarity connection for said load is connected to the emitter of said first transistor (Q2), the positive output connection of said solar panel is connected through said second auctioneer diode (D6) to the emitter of said second transistor (Q1) said second transistor (Q1) is of the PNP polarity type, and said first transistor (Q2) is of the NPN polarity type.

40. The power supply of claim 37 wherein said first capacitor (C1) is an electrolytic capacitor.

41. The power supply of claim 37, wherein said resistive voltage divider contains at least one diode for taking advantage of the non-linear conduction characteristic of a diode.

42. The power supply of claim 37, wherein the portion of said divider connected between the emitter and base of second transistor (Q1) comprises at least one diode (D1, D2) connected for forwardly biassed operation.

43. The power supply of claim 37, wherein the portion of said divider between said tap connection and said first one of said output connections of said solar panel comprise a reversely biassed diode (D3).

44. The power supply of claim 37, wherein a resistive leakage path is connected between said first polarity load connection and said load connection for a polarity opposite to said first polarity to prevent current leaking through said first transistor (Q2) in its nonconductive state from causing the voltage across said load to increase.

45. The power supply of claim 37, wherein said low level leakage diode is a reverse biassed germanium diode (D5).

46. The power supply of claim 37, wherein a second capacitor (C2) is connected between the said load connections of first and second polarity for preventing premature unlatching of the power supply from said load in consequence of a transient load condition.

47. The power supply of claim 46, wherein voltage limiting means are connected between the said load connections of first and second plurality.

48. The power supply of claim 37, wherein said voltage limiting means is a light-emitting diode.

49. The power supply of claim 37, wherein said load includes a driver circuit for a visual display and means for measuring a physical condition connected to said driver circuit for display in said liquid crystal display of a physical condition measurement.

50. The power supply of claim 49, wherein said display driver circuit is part of an integrated circuit which also includes a sample and hold circuit for making intermittent measurements of said physical condition, and wherein a second capacitor (C2) is connected across said load to prevent said intermittent measurements from producing premature unlatching of of the power supply from the load.

51. A method of powering by solar energy, economically assisted by a battery, an electronic instrument having a visual display, comprising:

charging a first capacitor (C1) by electric current produced by said solar panel or said battery or both, said capacitor (C1) having a first terminal which is connected to a first terminal of a solar panel through a first auctioneer diode (D6) and is connected to a first terminal of a battery through a second auctioneer diode (D7), said capacitor having a second terminal connected to second terminals respectively of said solar panel and said battery both of the same polarity;

operating a regenerative bipolar transistor latch unit connected in series with power input connections of said instrument and in series through said auctioneer diodes respectively with said solar panel and said battery, under control of a substantially resistance voltage divider connected in parallel with said first capacitor and having a tap connection to which a control connection of said latch unit is connected, said latch unit comprising first and second bipolar transistors of opposite polarity types, each having a base electrode connected to a collector electrode of the other, said second transistor having an emitter electrode connected to a first polarity power input connection of said instrument and said first transistor having an emitter electrode connected to a corresponding output connection of said solar panel and having a base electrode connected, for operation as a control electrode of said latch unit, to said tap connection of said voltage divider, and limiting the voltage of power supplied to said input connections of said instrument to a voltage band lying between an upper limit set by means of a voltage limiter diode connected between said first and a second terminal of said instrument and a lower limit set by said voltage divider including any extension thereof connected to said battery (R5).

52. The method of claim 51, wherein said voltage limiter diode is a light-emitter diode.

53. The method of claim 51, in which advantage is taken of the non-linear conduction characteristics of diode for controlling said latch unit by providing at least one diode in said voltage divider.

54. The method of claim 51, wherein a second capacitor (C2) connected in parallel to said power inputs of said instrument is charged through said latch unit, whereby transient changes in the amount of current delivered to said power input connections of said instrument are prevented from prematurely unlatching said latch unit.

55. The method of claim 51, wherein a slight but inevitable leakage current through said latch unit in its unlatched condition is prevented from building excessive potential across said power input connections of said instrument by a current leakage path connected across said power input connections of said instrument.

56. A low-power latch circuit for connecting and disconnecting a source of d.c. electric power to and from a load, said source and said load each having first and second means respectively for connections of opposite electric polarity said source having an output voltage subject to variation and having a first capacitance (C1) connected between its said first and second connection means, said latch circuit comprising:

a transistor (Q2) having a switchable conduction path connected between said first connection means of said source and said first connection means of said source and having a control electrode, said second connection means of said source and of said load being connected together;

voltage detection means (U2) for detecting a voltage lying above a first lower predetermined voltage and providing an output signal when a second higher predetermined voltage is exceeded, which voltage to be detected is a voltage present between said first and second connection means of said source and having an output for said output signal connected to said control electrode of said transistor for turning on said transistor after said second predetermined voltage is exceeded, a first resistive path (R6) being connected between said control electrode of said transistor and a said connection of said source for providing turn-on bias for said transistor during presence of said output signal of said voltage detection means and a second resistive path (R5, D9) connected between an input of said voltage detection means and said first connection means for setting said second predetermined voltage.

57. The latch circuit of claim 56, wherein said second resistive path includes at least one diode.

58. The latch circuit of claim 56, further comprising:

a second capacitance (C2) connected between said first and second connection means of said load, and a third resistance path (R7) connected between said first and second connection means of said load for rapidly diminishing electric charge stored in said second capacitor to a value insufficient to power an ambiguous operation of said load when said output signal of voltage detection means (U2) terminates.

59. The latch circuit of claim 56, wherein a voltage-limiting means (D4) is connected between said first and second connection means of said load, whereby power is deliverable to said load at a voltage not less than said second predetermined voltage and not more than a value set by said voltage limiting means.

60. The latch circuit of claim 59, wherein said voltage-limiting means is a dark light-emitting diode.

61. The d.c. power supply of claim 15 powered by said solar panel, with economical battery assistance at low levels of light, and capable of unattended supply of power to a load in widely varying light conditions, further comprising:

a battery having positive and negative output connections, said first capacitor (C1) having its first terminal connected to respective first output connections of said solar panel and of said battery which are of the same polarity and are also directly connected to said first connection means of a load;

a first auctioneer diode (D6) connected between a second output connection of said solar panel and said second terminal of said first capacitor (C1);

a second diode (D7) connected between a second output connection of said battery and said second terminal of said first capacitor (C1);

said means for accelerating turn-on of said transistor including a first resistive path (R6) connected between said control electrode of said transistor and said second terminal of said capacitor for said voltage detection means (U2) having a second resistive path (D9, D9) connected between an input of said voltage detection means and said second terminal of said first capacitor for setting said second predetermined voltage.

62. The power supply of claim 61, wherein a current limiting means (R5) is interposed in series with said second auctioneer diode (D7) between said battery and said capacitor (C1).

63. The power supply of claim 61, wherein said second resistive path includes at least one diode.

64. The power supply of claim 67, wherein said third resistive path includes a reverse-biased germanium diode.

65. The power supply of claim 61, wherein a voltage-limiting means (D4) is connected between said first and second connection means of said load.

66. The power supply of claim 65, wherein said voltage-limiting means is a light-emitting diode.

67. The power supply of claim 61, wherein said load is incorporated in an integrated circuit which includes a sample-and-hold circuit for performing intermittent operations, wherein a second capacitor (C2) is connected across said load to prevent said intermittent operations from prematurely turning off said transistor and wherein a third resistance path (R7) is connected between said first and second connection means of said load for rapidly diminishing electric charge stored in said second capacitor to a value insufficient to power an ambiguous operation of said load when said output signal of said voltage direction means (U2) terminates.

68. A method of powering by solar energy, with economical assistance of a battery at low light levels, an electronic instruments having a liquid crystal display, comprising:

charging a first capacitor by said battery during essentially total darkness, by said battery and said solar panel together from a first threshold light level in a band lying between 2 and 8 lux up to a second threshold light level in the band between 30 and 40 lux and exclusively by said solar battery at above said second threshold light level;

supplying voltage present across said capacitor to a voltage detector (U2) for providing an output signal to a control electrode of a transistor (Q2) having its switched path connected between a terminal of said capacitor and a terminal of said load, for turning on said transistor when a predetermined voltage is reached in said voltage detector where said voltage is reduced by a diode chain (D8, D9);

as soon as said transistor is turned on, keeping said transistor turned on, by means of a resistance path (R6) between said control electrode of said transistor and an electrode of said transistor connected to said capacitor, until a voltage above or near said predetermined voltage no longer is present as aforesaid in said voltage detector;

limiting the availability to said load of power from said battery by provision of auctioneer diodes (D6, D7) through which said solar panel and said battery are respectively connected to said first capacitor, and preventing leakage current through said transistor, when said transistor is turned off, from accumulating a charge in said load, by providing a leakage path resistance across said load.

69. The method of claim 68 wherein said leakage path is provided by a reverse-biassed germanium diode (D5).

70. The method of claim 68, in which voltage across the load is limited so as to supply only a narrow band of power supply output voltage to the load, with the lower limit being set by resistance elements (R5, D8, D9) and the voltage detector and the upper limit of said narrow band being set by voltage limiting means connected across the load.

71. The method of claim 68, in which intermittent operations that may occur in said load are prevented from prematurely turning off said transistor by the provision of a second capacitor (C2) connected across said load.

* * * * *

UNITED STATES PATENT AND TRADEMARK OFFICE
CERTIFICATE OF CORRECTION

PATENT NO. : 5,196,781

DATED : March 23, 1993

INVENTOR(S) : JAMIESON et al

It is certified that error appears in the above-identified patent and that said Letters Patent is hereby corrected as shown below:

Title page, right column, below "Abstract":

Change "2 Drawing Sheets" to --4 Drawing Sheets--.

The Drawings Figs. 1 and 2, change "Sheet 1 of 2" to --Sheet 1 of 4--.

Fig. 3, change "Sheet 2 of 2" to --Sheet 2 of 4--.

After Fig. 3, insert Figs. 4 and 5 (Sheets 3 and 4) attached hereto.

Signed and Sealed this

Tenth Day of May, 1994

*Attest:*

BRUCE LEHMAN

*Attesting Officer*     *Commissioner of Patents and Trademarks*